US006465975B1

(12) United States Patent

Naidu

(10) Patent No.: US 6,465,975 B1

(45) Date of Patent: Oct. 15, 2002

(54) METHOD AND SYSTEM FOR CONTROLLING TORQUE IN PERMANENT MAGNET BRUSHLESS ELECTRIC MOTORS

(75) Inventor: Malakondaiah Naidu, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/663,331

(22) Filed: Sep. 18, 2000

Related U.S. Application Data

(60) Provisional application No. 60/154,613, filed on Sep. 17, 1999, provisional application No. 60/154,681, filed on Sep. 17, 1999, and provisional application No. 60/183,301, filed on Feb. 17, 2000.

(51) Int. Cl.[7] .................................................. H02P 1/04

(52) U.S. Cl. ....................... 318/430; 318/138; 318/139; 318/431; 318/432; 318/433; 318/434; 318/480; 318/245; 318/254; 318/439; 180/79.1; 180/142

(58) Field of Search ................................ 318/430–480, 318/138, 245, 254, 439, 139; 180/79.1, 142

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kuhnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,686,437 A | 8/1987 | Langley et al. | 318/254 |
| 4,688,655 A | 8/1987 | Shimizu | 180/79.1 |
| 4,745,984 A | 5/1988 | Shimizu | 180/79.1 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,988,273 A | 1/1991 | Faig et al. | 425/145 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/79.1 |

(List continued on next page.)

*Primary Examiner*—Robert E. Nappi

*Assistant Examiner*—Tyrone Smith

(74) *Attorney, Agent, or Firm*—Edmund P. Anderson

(57) ABSTRACT

A novel method is proposed for controlling the torque of a PM brushless motor with sinusoidal back-emfs without current sensors by computing the required input phase voltages with measured rotor position and speed and known machine parameters. These voltages are fed to the machine at an angle computed in terms of input parameters and the phase voltage with respect to their back-emfs so that phase currents are aligned with their back-emfs to exactly mimic the performance of the current mode controller.

8 Claims, 2 Drawing Sheets

U.S. PATENT DOCUMENTS 5,063,011 A 11/1991 Rutz et al. .................. 264/126
5,069,972 A 12/1991 Versic ........................ 428/407
5,076,381 A 12/1991 Daido et al. ............... 180/79.1
5,122,719 A 6/1992 Bessenyei et al. .......... 318/629
5,223,775 A 6/1993 Mongeau .................... 318/432
5,239,490 A 8/1993 Masaki et al. .............. 364/565
5,331,245 A 7/1994 Burgbacher et al. ........ 310/186
5,345,156 A 9/1994 Moreira ...................... 318/254
5,349,278 A 9/1994 Wedeen ...................... 318/632
5,361,210 A 11/1994 Fu ........................ 364/424.05
5,428,285 A 6/1995 Koyama et al. ............ 318/799
5,433,541 A 7/1995 Hieda et al. ................ 400/279
5,444,341 A 8/1995 Kneifel, II et al. ......... 318/432
5,460,235 A 10/1995 Shimizu .................... 180/79.1
5,461,293 A 10/1995 Rozman et al. ............. 318/603
5,467,275 A 11/1995 Takamoto et al. ..... 365/426.01
5,469,215 A 11/1995 Nahiki ....................... 318/432
5,475,289 A 12/1995 McLaughlin et al. ....... 318/432
5,493,200 A 2/1996 Rozman et al. ............... 322/10
5,517,415 A 5/1996 Miller et al. ........... 364/424.05
5,554,913 A 9/1996 Ohsawa ...................... 318/424
5,568,389 A 10/1996 McLaughlin et al. .. 364/424.05
5,569,994 A 10/1996 Taylor et al. ............... 318/700
5,579,188 A 11/1996 Dunfield et al. ......... 360/99.08
5,585,708 A 12/1996 Richardson et al. ........ 318/800
5,616,999 A 4/1997 Matsumura et al. ........ 318/632
5,623,409 A 4/1997 Miller ................. 364/424.051
5,642,004 A 6/1997 Weber ................... 324/207.25
5,656,911 A 8/1997 Nakayama et al. ......... 318/718
5,668,721 A 9/1997 Chandy ....................... 701/41
5,672,944 A 9/1997 Gokhale et al. ............ 318/254
5,701,065 A 12/1997 Ishizaki ...................... 318/701
5,739,650 A 4/1998 Kimura et al. .............. 318/254
5,777,449 A 7/1998 Schlager ..................... 318/459
5,780,986 A 7/1998 Shelton et al. .............. 318/432
5,803,197 A 9/1998 Hara et al. .................. 180/248
5,811,905 A 9/1998 Tang .......................... 310/179
5,852,355 A 12/1998 Turner ........................ 318/701
5,881,836 A 3/1999 Nishimoto et al. ......... 180/446
5,898,990 A 5/1999 Henry ......................... 29/598
5,919,241 A 7/1999 Bolourchi et al. ............ 701/41
5,920,161 A 7/1999 Obara et al. ................ 318/139
5,929,590 A 7/1999 Tang .......................... 318/701
5,962,999 A 10/1999 Nakamura et al. .......... 318/432
5,963,706 A 10/1999 Baik .......................... 388/804
5,977,740 A 11/1999 McCann ..................... 318/701
5,984,042 A 11/1999 Nishimoto et al. ......... 180/446
5,992,556 A 11/1999 Miller ........................ 180/446
6,002,226 A 12/1999 Collier-Hallman et al. . 318/439
6,002,234 A * 12/1999 Ohm et al. ................. 318/729
6,009,003 A * 12/1999 Yeo ............................ 363/37
6,034,460 A 3/2000 Tajima ....................... 310/179
6,034,493 A 3/2000 Boyd et al. ................. 318/254
6,043,624 A 3/2000 Masaki et al. .............. 318/723
6,049,182 A 4/2000 Nakatani et al. ............ 318/432
6,129,172 A 10/2000 Yoshida et al. ............. 180/446

* cited by examiner

METHOD AND SYSTEM FOR CONTROLLING TORQUE IN PERMANENT MAGNET BRUSHLESS ELECTRIC MOTORS

CROSS-REFERENCE TO RELATED APPLICATIONS

This application is based upon, and claims the benefit of, U.S. Provisional Patent Application No. 60/154,613, filed Sep. 17, 1999; No. 60/154,681, filed Sep. 17, 1999; and No. 60/183,301, filed Feb. 17, 2000, the disclosures of all three of which are incorporated by reference herein in their entirety.

TECHNICAL FIELD

This invention relates to torque control in automotive permanent magnet (PM) brushless electric motors.

BACKGROUND OF THE INVENTION

It is known in the art of permanent magnet brushless electric motors to control torque by aligning phase currents with back-emf. The torque delivered by the electric motor is then directly proportional to the phase current and is therefore easily controlled by simply controlling the aligned phase currents. This is commonly referred to as "current mode control." The drawback is that current sensors are required to determine what the currents are. The sensors necessarily have a finite, though small, dc voltage drops that induce torque ripple into the motor.

SUMMARY OF THE INVENTION

An exemplary embodiment is a method of controlling torque in electric motors that is analogous to traditional current mode control methods, but which requires no current sensors to determine what the current is in any particular phase. Instead, phase current information is calculated from knowledge of the rotor's position and rate of rotation. The information is used to calculate a required voltage and electrical angle offset needed to obtain a user-specified torque. The calculated voltage and offset is added to the input power of the electric motor by known means, usually an inverter.

DESCRIPTION OF THE PREFERRED EMBODIMENT

Figure 1:
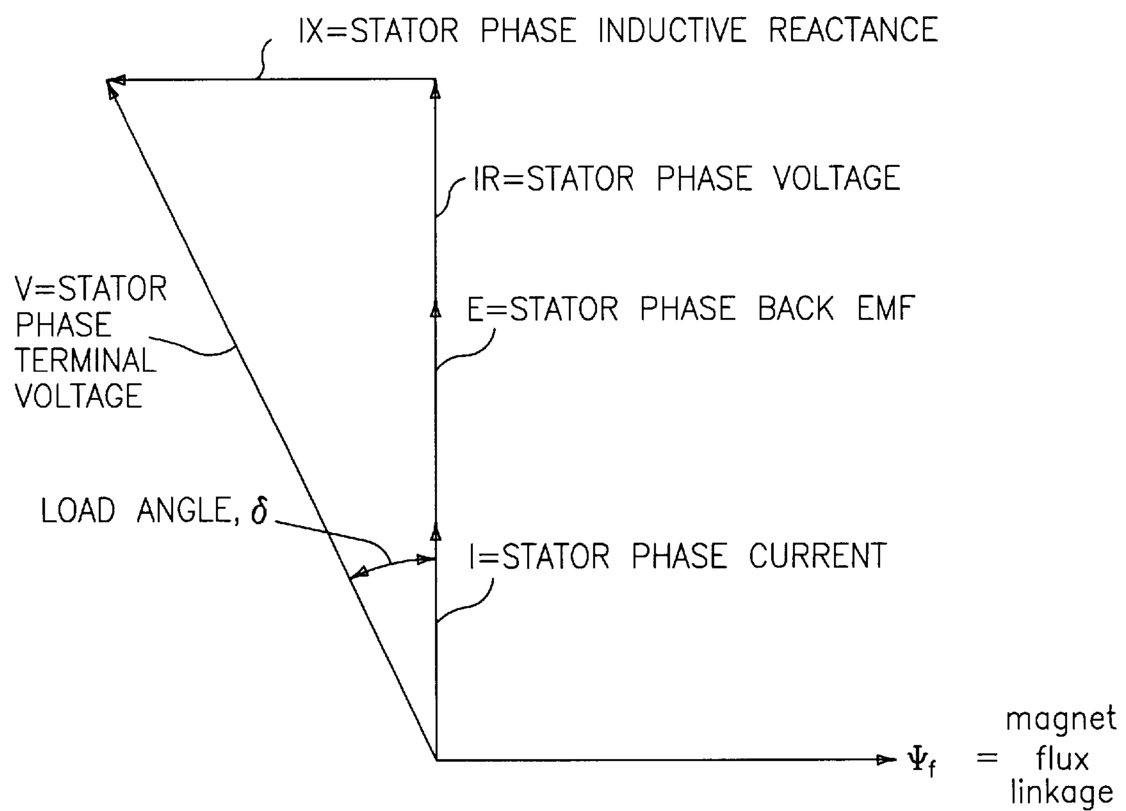
FIG. 1 is a phasor diagram for a permanent magnet motor.
Figure 2:
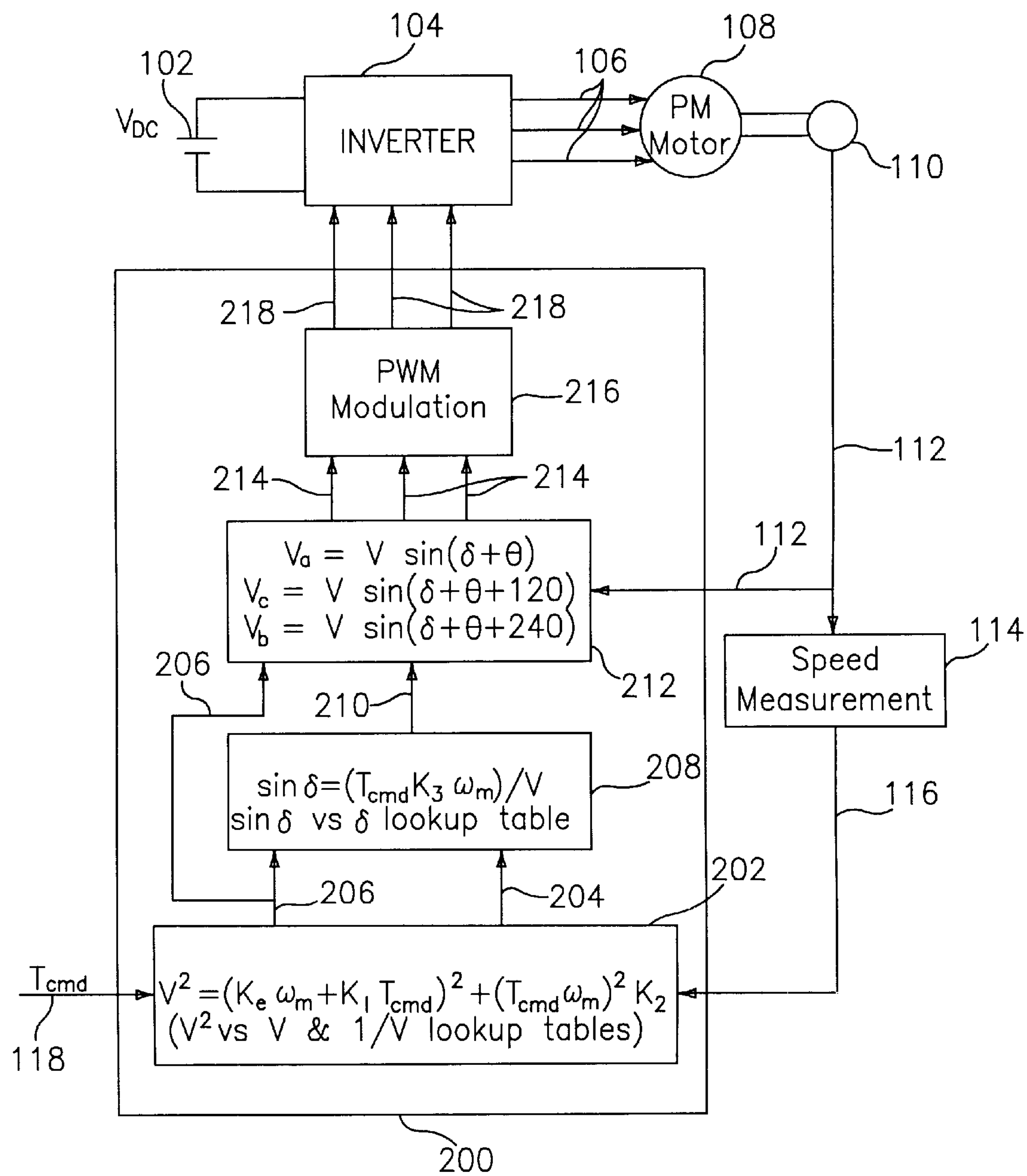
FIG. 2 is a schematic representation of a system for controlling the torque of a sinusoidally excited permanent magnet motor.

A description of the preferred embodiment of the present invention will now be had with reference to FIGS. 1 and 2 of the drawings.

Referring to FIG. 1 there is shown a phasor diagram. In permanent magnet (PM) synchronous machines with sinusoidal back-emfs, torque control is accomplished by regulating the phase currents and aligning them with respective back-emfs, typically by adding a phase voltage to the motor input at a load angle δ. Under these conditions, the torque is directly proportional to the phase current. This is shown in the phasor diagram of FIG. 1, wherein:

E=stator phase back-emf,

V=stator phase terminal voltage,

I=stator phase current,

R=stator phase resistance, $X=\omega_e \cdot L_a$=stator phase reactance, $\omega_e$=electrical angular frequency, rad/sec, $L_a$=stator phase inductance, δ=load angle between back-emf and stator phase terminal voltage, and $\Psi_f$=magnet flux linkage.

The electromagnetic torque of the machine is given by $$T_e=3E \cdot I/\omega_m \tag{1}$$

where $\omega_m=P\cdot\omega_e$=mechanical angular frequency in rad/sec, and P=number of pole pairs. Equation (1) may be written in terms of a back-emf constant, $K_e$ as $$T_e=3K_e \cdot I \tag{2}$$

Where $K_e=E/\omega_m$, V/(mech rad/s). Because torque is directly proportional to the phase current in current mode controller, it requires two current sensors for measuring phase currents.

The drawback of current mode control is the production of low frequency torque ripple caused by dc offset in the current measurements of the current sensors. This is undesirable in the case of column-assisted electric power steering where the sinusoidal PM motor is coupled directly into the steering column to provide torque assistance.

The phasor diagram of FIG. 1 is used to compute required phase voltages for a given torque command, $T_{cmd}$:

$$V=(E+I\cdot R)+j\cdot I\cdot X \tag{3}$$

where j is the imaginary square root of −1, therefore $$V^2=(E+I\cdot R)^2+(I\cdot X)^2 \tag{4}$$

From Equation (2), $$I=T_{cmd}/3K_e \tag{5}$$

Substituting Equation (5) into Equation (4) gives $$v^2=[E+(T_{cmd}\cdot R/3K_e)]^2+[T_{cmd}\cdot P\cdot L_a\cdot\omega_m 3K_e]^2 \tag{6}$$

Equation (6) can then be simplified as $$V=[(K_e\cdot\omega_m+K_1\cdot T_{cmd})^2+K_2(T_{cmd}\cdot\omega_m)^2]^{1/2} \tag{7}$$

where $K_1=R/3K_e$ and $K_2=(P\cdot L_a/3K_e)^2$. The phase voltages can also be obtained from a $V^2$ vs. V look-up table to reduce computational time.

From FIG. 1, the load angle, δ, is obtained in terms of known parameters as $$V\cdot\sin\delta=T_{cmd}\cdot\omega_m\cdot K_3 \tag{8}$$

and therefore, $$\delta=\sin^{-1}(T_{cmd}\cdot\omega_m\cdot K_3/V) \tag{9}$$

where $K_3=P\cdot L_a/3K_e$

The load angle, δ, can be calculated from a V·sin δ vs δ look-up table and $V^{-1}$ can be obtained from a $V^2$ vs $V^{-1}$ look-up table to reduce computational time. Therefore, the input phase voltages are $$V_a=V\cdot\sin(\delta+\theta) \tag{10}$$

$$V_b=V\cdot\sin(\delta+\theta+120°) \tag{11}$$

$$V_c=V\cdot\sin(\delta+\theta+240°) \tag{12}$$

Referring to FIG. 2, the system in an exemplary embodiment includes a rotor position encoder 110 coupled to a PM motor 108. The encoder 110 is operative to measure the angular position, θ, of the rotor of the motor and provides as output a position signal 112 indicative thereof. A speed measuring circuit 114 is connected to the position encoder 110 for determining the angular speed, $d\theta/dt=\omega_m$ and providing as output therefrom a speed signal 116 indicative thereof. The position and angular speed signals 112, 116 as well as a torque command signal, $T_{cmd}$, 118, indicative of a desired motor torque, are applied to a controller 200. The controller 200 generates the input phase voltages 214 and motor voltage command signals 218 in response to the position and angular speed signals 112, 116 and the torque command signal 118. Blocks 202, 208. 212, and 216 indicate processing performed by controller 200. An inverter 104 is coupled between a power source 102 and the controller 200 for applying phase voltages 106 across the motor 108 in response to the motor voltage command signals 218 in order to develop the desired motor torque. In order to generate phase voltages 106 with an average sinusoidal shape, switching devices indigenous to the inverter 104, must be turned on and off for specific durations at specific rotor angular positions, θ. Control of the inverter 104 to generate phase voltages 106 with an average sinusoidal shape can be implemented by way of any appropriate pulse width modulation (PWM) scheme 216. Because space vector modulation (SVM) has advantages in higher output voltage, low harmonic distortion, low switching power loses and easy microprocessor implementation, SVM-based control may be preferred.

An exemplary method includes sensing the angular position, θ, of the rotor and determining the angular speed, $d\theta/dt=\omega_m$, thereof. In response to the angular position, θ, and angular speed, $\omega_m$, of the rotor and to the torque command signal, $T_{cmd}$, 118, the controller 200 generates motor voltage command signals 218 indicative of the voltage required to produce the desired motor torque. Phase voltages 106 are applied across the motor windings in response to the motor voltage command signals 218 to develop the desired motor torque. In particular, in response to the torque command signal, $T_{cmd}$, 118, the angular speed signal 116 and known parameters, at 202 the controller 200 calculates V according to Equation (7) above. Alternatively, V may be determined by using $V^2$ vs V or $V^2$ vs $V^{-1}$ look-up tables. Based upon the calculated value for V and known parameters, at 208 the controller 200 calculates δ according to Equation (9) above. Alternatively, δ may be determined by using a sin δ vs δ look-up tables. Based upon the calculated value for V, the calculated value for δ and the angular position, θ, at 212 the controller 200 calculates the input phase voltages, $V_a$, $V_b$, and $V_c$, 214. At 216, input phase voltages, $V_a$, $V_b$, and $V_c$, 214 are subject to a pulse width modulation (PWM) scheme. Motor voltage command signals 218, indicative of the voltage required to produce the desired motor torque and in the form of pulse width modulated signals having an average sinusoidal shape, are applied to the inverter 104 wherein the necessary switching is performed for application to the motor 108. By controlling torque without using current sensors, torque ripple is reduced resulting in smoother application of torque.

While the invention has been described by reference to a preferred embodiment, it should be understood that numerous modifications can be made thereto. Accordingly it is intended that the invention not be limited to the disclosed embodiment, but that it retain the full scope and spirit permitted by the language of the appended claims.

What is claimed is:

1. A voltage mode control method for providing torque from a sinusoidally excited permanent magnet automotive motor, comprising:

measuring the angular position of the rotor of the motor;

determining the angular speed of the rotor of the motor;

establishing a torque command signal indicative of a desired motor torque;

in response to the angular position of the rotor, the angular speed of the rotor and the torque command signal, calculating the load angle of the motor and generating thereby motor voltage command signals for producing the smooth motor torque that corresponds to the torque command signal; and in response to the motor voltage command signals, applying phase voltages across the motor to produce the torque.

2. The method as set forth in claim 1 wherein generating motor command signals includes controlling the phase current of the motor to be in phase with the back-emf.

3. The method as set forth in claim 2 wherein generating motor command signals includes controlling the voltages across the motor phases to be in phase with respective back-emfs of the motor phases.

4. The method as set forth in claim 3 wherein controlling the voltages across the motor includes generating pulse width modulation signals to control an inverter; said inverter coupled between a power source and a controller for applying the phase voltages across the motor.

5. The method as set forth in claim 1 wherein generating motor voltage command signals includes calculating the amplitude of input phase voltages of the motor according to the equation $$V=[(K_e\cdot\omega_m+K_1\cdot T_{cmd})^2+K_2(T_{cmd}\cdot\omega_m)^2]^{1/2}$$

where

V=amplitude of the input phase voltages of the motor, $K_1=R/3K_e$, $K_2=(P\cdot L_a/3K_e)^2$, $K_e=E/\omega_m$, $\omega_m$=rotor angular speed, $T_{cmd}$=torque command signal, E=stator phase back-emf, R=stator phase resistance, $L_a$=stator phase inductance, P=number of pole pairs.

6. A system for providing a torque from a sinusoidally excited permanent magnet automotive motor comprising:

a sensor coupled to the motor for measuring the angular position of the rotor of the motor and for providing as output therefrom an angular position signal indicative of the angular position of the rotor of the motor;

a speed measuring circuit coupled to the sensor for determining the angular speed of the rotor of the motor and for providing as output therefrom an angular speed signal indicative of the angular speed of the rotor of the motor;

a controller for calculating, in response to the angular position of the rotor, the angular speed of the rotor and the torque command signal, the load angle of the motor generating thereby motor voltage command signals for producing the motor torque that corresponds to the torque command signal;

an inverter coupled between a power source and the controller for applying phase voltages across the motor in response to the motor voltage command signals to produce a smooth motor torque corresponding to the torque command signal.

7. A power steering assist system comprising:

a steering wheel and column;

an electric motor comprising a motor controller, said electric motor adapted to impart rotational force to said steering column;

a power steering controller adapted to control said electric motor in a manner effective in providing power steering assist to an operator of said steering wheel;

a sensor coupled to the motor for measuring the angular position of the rotor of the motor and for providing as output therefrom an angular position signal indicative of the angular position of the rotor of the motor;

a speed measuring circuit coupled to the sensor for determining the angular speed of the rotor of the motor and for providing as output therefrom an angular speed signal indicative of the angular speed of the rotor of the motor;

a controller for calculating, in response to the angular position of the rotor, the angular speed of the rotor and the torque command signal, the load angle of the motor generating thereby motor voltage command signals for producing the motor torque that corresponds to the torque command signal; and an inverter coupled between a power source and the controller for applying phase voltages across the motor in response to the motor voltage command signals to produce a motor torque corresponding to the torque command signal.

8. A voltage mode control method for reducing torque ripple in a sinusoidally excited permanent magnet automotive motor, comprising:

measuring the angular position of the rotor of the motor;

determining the angular speed of the rotor of the motor;

establishing a torque command signal indicative of a desired motor torque;

in response to the angular position of the rotor, the angular speed of the rotor and the torque command signal, calculating the load angle of the motor and generating thereby motor voltage command signals for producing the motor torque that corresponds to the torque command signal; and in response to the motor voltage command signals, applying phase voltages across the motor to produce the torque.

* * * * *

UNITED STATES PATENT AND TRADEMARK OFFICE

CERTIFICATE OF CORRECTION

PATENT NO. : 6,465,975 B1
APPLICATION NO. : 09/663331
DATED : October 15, 2002
INVENTOR(S) : Malakondaiah Naidu It is certified that error appears in the above-identified patent and that said Letters Patent is hereby corrected as shown below:

Title Page:
Item (56), References Cited, U.S. Patent Documents, after “5,469,215”, delete “Nahiki” and insert therefor --Nashiki--.
Item (56), References Cited, U.S. Patent Documents, delete “5,642,004” and insert therefor --5,642,044--.

Figure 2:
Item 212, before “=Vsin(d+Θ+120)”, delete “Vc” and insert therefor --Vb--.
Item 212, before “=Vsin(d+Θ+240)”, delete “Vb” and insert therefor --Vc--.
Item 202, before “$=(KeWm+K_1T_{cmd})^2$”, delete “$V^2$” and insert therefor --V--.

Column 1:
Line 30, after “have”, delete “a”.

Column 2:
Line 43, after “[$T_{cmd} \cdot P \cdot La.$ ”, delete “Wm3Ke” and insert therefor --Wm/3Ke--.

Column 3:
Line 47, after “look-up”, delete “tables” and insert therefor --table--.

Signed and Sealed this

Seventeenth Day of April, 2007

JON W. DUDAS
*Director of the United States Patent and Trademark Office*